UNITED STATES PATENT OFFICE.

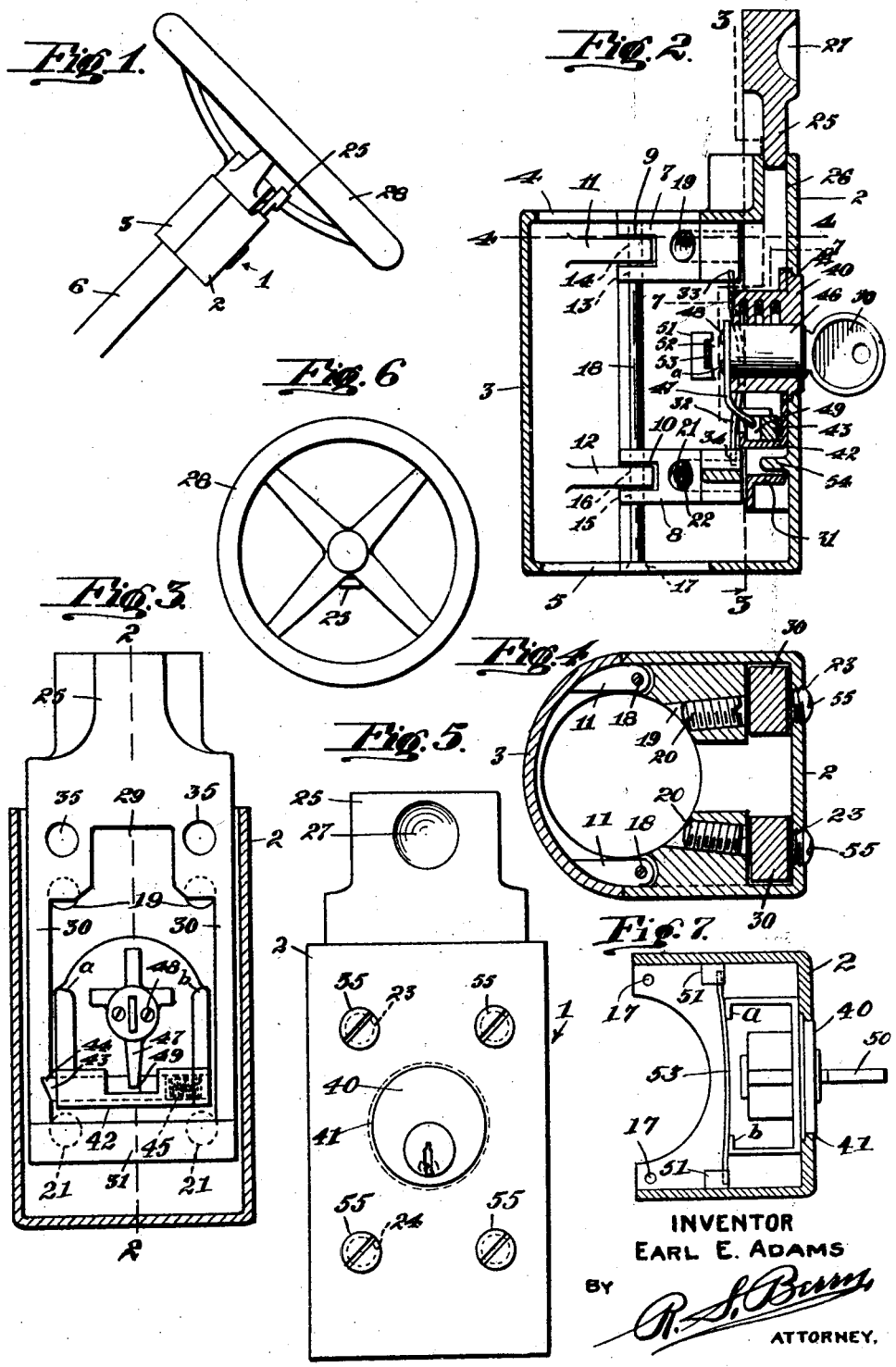

EARL E. ADAMS, OF GLENDALE, CALIFORNIA.

STEERING-WHEEL LOCK.

1,409,640.

Specification of Letters Patent.   Patented Mar. 14, 1922.

Application filed June 7, 1920.   Serial No. 387,168.

*To all whom it may concern:*

Be it known that I, EARL E. ADAMS, a citizen of the United States, residing at Glendale, in the county of Los Angeles and State of California, have invented new and useful Improvements in Steering-Wheel Locks, of which the following is a specification.

My invention is an automobile lock to prevent theft of automobiles.

One of the objects of my invention is to provide a lock applicable to the steering column of an automobile, constructed with a locking bolt adapted to be introduced between the spokes of the steering wheel to prevent turning and steering of the automobile.

Other objects will appear from the following description.

My invention is illustrated in the annexed drawing forming a part of this specification, in which:

Figure 1 is a side view of an automobile steering wheel and column with my lock attached to the column and the lock bolt introduced between two spokes of the wheel locking the wheel against turning.

Figure 2 is a vertical longitudinal section of my lock taken on line 2—2 of Figure 3.

Figure 3 is a vertical longitudinal section of my lock taken on line 3—3 of Figure 2.

Figure 4 is a horizontal section of my lock taken on line 4—4 of Figure 2.

Figure 5 is a view of my lock as seen in front elevation.

Figure 6 is a plan view of a steering wheel with my lock mounted on the steering column.

Figure 7 is a detail in horizontal section as seen on the line 7—7 of Figure 2 showing the manner of mounting the lock in the casing.

The part marked 1 indicates the lock casing which is made in two sections, a front section 2 and a rear section 3, the upper and lower walls of said casing being provided with openings 4 and 5, half of the opening 4 being in the upper wall of casing section 3, and the other half of said opening being in the upper wall of section 2, and half of the opening 5 being in the lower wall of section 3, and the other half of section 2 which openings receive the steering column 6 of an automobile, so that the steering column stands vertically through the casing. The casing section 2 has a pair of lugs 7 in the upper corner thereof, spaced rearwardly from the front wall of said section and extending to the rear edge of said section. The casing section 2 is provided with a pair of lugs 8 on the interior of the side walls, said lugs being spaced a short distance above the lower wall of said section and a short distance from the front wall thereof and extending to the rear edge of said section. The lugs 7 are provided with horizontal recesses 9 in their rear ends and the lugs 8 are provided with horizontal recesses 10 in their rear ends, which recesses receive lugs 11 and 12 respectively, on the interior of the rear section 3 of the casing. The lugs 7 are provided with apertures 13 extending through the recess walls into the recesses 9 which apertures register with apertures 14 in the lugs 11, when said lugs are in the recesses 9. The lugs 8 are provided with apertures 15 extending through the recess walls to the recesses 10, which apertures register with apertures 16 in the lugs 12, when said lugs are in the recesses 10. The lower wall of the section 2 is provided with apertures 17, said apertures and the apertures 15 and 13 being in alignment with each other. With the lock casing on the steering column, as above described, pins 18 are driven tightly through the openings 17, openings 15 in lugs 8, openings 16 in lugs 12, openings 13 in lugs 7, openings 14 in lugs 11, whereby the sections 2 and 3 are held together around the steering column 6. The lugs 7 are provided with rearwardly extending threaded apertures 19 in which are set screws 20 and the lugs 8 are provided with rearwardly extending threaded openings 21 in which screw set screws 22. Superimposed pairs of set screws are thus provided and arranged so as to engage the column on the side thereof opposite the section 3 and on opposite sides of the diametrical center of the column extending in the general directions of the screws, whereby on tightening the screws a pull will be communicated transversely through the pins 18 to the back section 2 to clamp the latter tight against the column and at the same time clamp the pins in the lugs against longitudinal movement and displacement. The front wall of the casing section 2 is provided with apertures 23 and 24 in register with the screws 20 and 22 respectively, through which apertures a screw driver may be inserted to turn said screws 20 and 22 so that they will bind upon the steering column 6 and firmly hold the casing 1 on said steering column. A vertical locking slide bolt 25 is slidably mounted in the casing section 2 between the front wall of said casing, and the lugs 7 and 8 in a bearing 26 on the upper forward part of said section, said locking bolt extending through said bearing above the casing. The locking bolt 25 is provided with a finger recess 27 in its front surface near the top thereof, by means of which the bolt may be gripped by the fingers to be moved upwardly between the spokes of the steering wheel 28 to lock the steering wheel against turning and downwardly from between the spokes of the steering wheel to unlock the steering wheel as will be hereinafter more fully described. The locking bolt 25 is provided with an opening 29 which rests within the casing, which opening forms side members 30 and a lower end member 31 on the bolt. Flat metal springs 32 are interposed between the rear face of the bolt side members 30 and the lugs 7 and 8 said lugs being recessed at 33 and 34 to receive the ends of said springs, said springs serving to hold the lower portion of the bolt 25 against the front wall of the casing section 2 and preventing free movement and rattling of the bolt. The bolt 25 is provided with apertures 35 which are adapted to register with the apertures 23 and the screws 20 when the bolt is retracted within the casing from between the spokes of the steering wheel, and the steering wheel is unlocked so that the screw driver may be inserted through the openings 23 and 35 to engage the screws 20 to tighten the same against the steering column to hold the casing on the steering column or to loosen said screws for removing the casing from the steering column. When the bolt 25 is retracted within the casing, out of engagement with the spokes of the steering wheel, the opening 29, in said locking bolt 25, registers with the openings 24 in the casing section 2 to permit the screw driver to be inserted through the openings 24, and the opening 29, to tighten the screws 22 against the steering column to hold the casing on the steering column or to loosen said screws from the steering column so that the casing may be removed therefrom. When the bolt 25 is extended to its locking position between the spokes of the steering wheel the openings 35 are out of register with the openings 23, and the opening 29 is out of register with the openings 24, and the body of the bolt is interposed between the openings 23 and the set screws 20, and the lower end member 21 of the bolt is interposed between the openings 24 and the screws 22, which prevents the introduction of a screw driver through the openings 23 and 24 to turn the screws 20 and 22 and thus slide the casing down on the steering column 6 and the locking bolt from between the spokes of the steering wheel. A lock 40 is mounted in the forward part of the casing section 2 in an opening 41 in the front wall of said casing section and within the opening 29 of the locking slide bolt 25. On the lock inside the casing is a horizontal bearing 42 in which is mounted a slidable latch 43 for engaging a notch 44 on the inside of one of the side members 30 of the locking bolt for locking said bolt in its extending locking position between the spokes of the steering wheel. A spring 45 is interposed between the end of the latch 43 opposite its locking end and the end of the bearing 42, which spring snaps the latch 43 into the notch 44 when the locking bolt 25 is drawn upwardly between the spokes of the steering wheel into locking position and hold said latch into said notch to maintain said bolt in locking position. On the rear end of the tumbler 46 of the lock 40 is secured an arm 47 by means of screws 48, which arm projects into a notch 49 in the latch 43 and is adapted to engage one end of said notch when the key 50 is inserted in the lock and turned to unlock the lock whereby the latch 43 is withdrawn from the notch 44 so that the locking bolt 25 may be retracted within the casing from between the spokes of the steering wheel and the steering wheel unlocked. On the inside of the side walls of the casing section 2 are lugs 51 provided with notches 52 to receive the ends of a flat spring 53, whereby the lock is detachably held against the inside of the front wall of the casing section 2 in its proper position, as particularly shown in Figure 7; the spring bearing against flanges $a$ and $b$ on the lock to press against the latter and thus retain it in place without the use of screws. After the casing has been attached to the column the latter serves as an obstacle to prevent the lock being pressed inwardly from the interior of the casing in opposition to the spring 53. A lug 54 extends rearwardly from the inside of the front wall of the section 2 within the opening 29 in the locking bolt 25 for engaging the lower member 31 of said locking bolt to limit the upper movement of said bolt in locking position. When it is desired to lock the steering wheel the bolt is pulled upwardly between the spokes of the steering wheel until the latch 43 snaps into the notch 44 under the influence of the spring 45, thus locking the bolt between the spokes of the steering wheel. To unlock the steering wheel the key 50 is inserted in the lock 40 and turned to the left whereupon the arm 47 engaging the right end of the notch 49 withdraws the latch 43 from the notch 44 so that the bolt 25 may be gripped by the fingers and pulled down from between the spokes of the steering wheel. The springs 32 bearing upon the side members of the locking bolt 25 provide sufficient friction to hold the locking bolt 25 in any position into which it may be drawn, thus preventing the vibration of the automobile when driven by the owner from projecting the locking bolt upwardly between the spokes of the steering wheel and preventing steering of the automobile.

The width of the upper locking end of the locking bolt 25 is such that it fits rather closely between the spokes of the steering wheel as shown in Figure 6, thus preventing any turning movement whatever of the steering wheel.

The upper end of the upper openings 13 in the lugs 7 are closed by the upper wall of the casing section 2, thus concealing the upper end of the rods 18 and making it difficult for a thief to see how the sections 2 and 3 are secured together.

The openings 23 and 24 are threaded to receive blind screws 55.

I claim:

1. An automobile lock comprising a casing formed in two sections adapted to fit around the steering column of an automobile, lugs on one section of said casing interiorly thereof provided with apertures, lugs on the other section of said casing interiorly thereof provided with apertures adapted to register with the apertures in the lugs on the other section of said casing, rods adapted to be extended through the apertures of said lugs to hold said sections together loosely around the steering column, means for tightening said casing on the steering column and simultaneously tighten the rods in said lugs, a locking bolt mounted in said casing adapted to be projected between the spokes of the steering wheel, and a lock in said casing for locking said locking bolt so projected.

2. An automobile lock including a casing constructed to be detachably fitted around the steering column of an automobile, superimposed pairs of lugs in said casing provided with threaded openings, screws in said openings engaging the column on opposite sides of the center thereof, openings in the wall opposite said threaded openings through which said screws may be introduced and screwed through said threaded openings against the steering column to bind the casing onto the steering column, a locking bolt mounted in said casing to be projected upwardly therefrom, said bolt being interposed between said threaded openings and the openings in said wall when the bolt is projected upwardly, and means for locking said locking bolt when so projected.

3. An automobile lock including a casing constructed to be detachably fitted around the steering column of an automobile, lugs in said casing provided with threaded openings, screws in said openings engaging the column on the opposite sides of the center thereof, openings in the wall opposite said threaded openings through which said screws may be introduced and screwed through said threaded openings against the steering column to bind the casing unto the steering column, a locking bolt mounted in said casing to be projected upwardly therefrom, said bolt being interposed between said threaded openings and the openings in said wall when the bolt is projected upwardly, means for locking said locking bolt when so projected, and blind screws screwed into the openings in said wall.

4. An automobile lock including a casing constructed to be detachably fitted around the steering column of an automobile, lugs in said casing provided with threaded openings, screws in said openings engaging the column on the opposite sides of the center thereof, openings in the wall opposite said threaded openings through which said screws may be introduced and screwed through said threaded openings against the steering column to bind the casing onto the steering column, a locking bolt mounted in said casing to be projected upwardly therefrom, said bolt being interposed between said threaded openings and the openings in said wall when the bolt is projected upwardly, means for locking said locking bolt when so projected, said locking bolt being provided with openings adapted to register with said threaded openings and the openings in said wall when the bolt is retracted in the casing out of locking position.

5. An automobile lock including a casing formed in two sections adapted to fit around the steering column of an automobile, lugs interiorly of each section of said casing provided with apertures adapted to register with each other when the casing is fitted around the steering column, the bottom wall of said casing being provided with apertures through which rods may be introduced through the registering apertures in said lugs to hold the sections together around said steering column, the upper wall of one of said sections closing and concealing the uppermost opening in the uppermost lug, means for tightening said casing on said steering column, a locking bolt mounted in said casing adapted to be introduced between the spokes of the steering wheel, and means for locking said locking bolt when projected between the spokes of the steering wheel.

6. An automobile lock including a casing formed in two sections adapted to be fitted around the steering column of an automobile, lugs in one of said sections provided with threaded openings and formed, with recesses having registering openings in their side walls, lugs on the other section adapted to fit in said recesses and provided with openings adapted to register with the openings in the recesses, rods adapted to be driven in said registering openings to hold the said casing sections together around said steering post, a wall of said casing being provided with openings registering with said threaded openings through which wall openings set screws may be introduced and screwed through said threaded openings against the steering post to tighten the casing upon the steering post, a locking bolt mounted in said casing adapted to be projected between the spokes of the steering wheel and adapted to be interposed between said wall openings and said threaded openings when so projected, and means for locking said locking bolt when projected between the spokes of the steering wheel.

7. An automobile lock including a casing constructed to be fitted around the steering column of an automobile, a bolt mounted in said casing to be projected between the spokes of the steering wheel, a lock fitted in the front wall of said casing for locking said locking bolt projected between the spokes of the steering wheel, and a spring member mounted on said casing acting to detachably hold said lock in position.

EARL E. ADAMS.